(12) United States Patent
Yasuda

(10) Patent No.: US 7,355,634 B2
(45) Date of Patent: Apr. 8, 2008

(54) MOVING IMAGE PICKUP APPARATUS CARRYING OUT AUTOMATIC FOCUS ADJUSTMENT AND STILL IMAGE RECORDING METHOD THEREFOR

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 745 days.

(21) Appl. No.: 10/872,512

(22) Filed: Jun. 22, 2004

(65) Prior Publication Data

US 2005/0018071 A1    Jan. 27, 2005

(30) Foreign Application Priority Data

Jun. 23, 2003  (JP) .............................. 2003-177912
Jun. 23, 2003  (JP) .............................. 2003-177913

(51) Int. Cl.
*H04N 5/225*   (2006.01)
*H04N 5/232*   (2006.01)
*G03B 3/00*    (2006.01)

(52) U.S. Cl. .................... 348/220.1; 348/349; 396/137
(58) Field of Classification Search ............. 348/220.1, 348/221.1, 345, 351, 349, 354, 356; 396/137
See application file for complete search history.

(56) References Cited

U.S. PATENT DOCUMENTS

| | | | | |
|---|---|---|---|---|
| 4,474,447 A | * | 10/1984 | Kawabata et al. .......... | 396/130 |
| 4,734,730 A | * | 3/1988 | Ootsuka et al. ............. | 396/104 |
| 4,881,097 A | * | 11/1989 | Ishiguro ..................... | 396/133 |
| 4,977,457 A | * | 12/1990 | Tamekuni et al. .......... | 348/348 |
| 5,027,147 A | * | 6/1991 | Kaneda ........................ | 396/81 |
| 5,604,561 A | * | 2/1997 | Ozawa et al. ................. | 396/96 |
| 6,710,808 B1 | * | 3/2004 | Yamagishi ............... | 348/221.1 |
| 6,809,760 B1 | * | 10/2004 | Takagi et al. ............ | 348/211.9 |
| 2003/0081137 A1 | * | 5/2003 | Yamazaki ................... | 348/354 |
| 2004/0263674 A1 | * | 12/2004 | Koreki ....................... | 348/345 |

FOREIGN PATENT DOCUMENTS

GB    2250830 A  *  6/1992

* cited by examiner

*Primary Examiner*—John M. Villecco
(74) *Attorney, Agent, or Firm*—Fitzpatrick, Cella, Harper & Scinto

(57) ABSTRACT

A moving image pickup apparatus which is capable of attaining both enhanced focusing accuracy and increased chances of snapshooting. A predetermined time period is determined according to a designated image pickup period. Responsive to designation of still image recording, an automatic focus adjusting device starts automatic focus adjustment. When an in-focus state is obtained by the automatic focus adjusting device within the determined predetermined time period, a still image for which the in-focus state has been obtained is stored in a memory device. On the other hand, when the in-focus state is not obtained even after the lapse of the determined predetermined time period, a still image for which the in-focus state has not been obtained is stored in the memory device.

13 Claims, 13 Drawing Sheets

| | SHUTTER SPEED | | | |
|---|---|---|---|---|
| | 1/60 SEC. | 1/30 SEC. | 1/15 SEC. | 1/8 SEC. |
| PREDETERMINED TIME PERIOD | 1.5 SEC. | 3 SEC. | 6 SEC. | 12 SEC. |

MOVING IMAGE PICKUP APPARATUS CARRYING OUT AUTOMATIC FOCUS ADJUSTMENT AND STILL IMAGE RECORDING METHOD THEREFOR

BACKGROUND OF THE INVENTION

1. Field of the Invention

The present invention relates to a moving image pickup apparatus and a still image recording method for the apparatus, a program for implementing the method, and a storage medium storing the program.

2. Description of the Related Art

The driving speed at which an image pickup apparatus, such as a video camera, is driven (hereinafter referred to as "the shutter speed") is originally $\frac{1}{60}$ seconds according to the NTSC standard, but recently, to expand the photographable range, a photographing mode in which the shutter speed is set to a lower value of $\frac{1}{15}$ seconds, or an even lower value of $\frac{1}{2}$ seconds comes into actual use.

On the other hand, a great majority of video cameras have an automatic focus adjusting device (autofocus device) employing a method of detecting the sharpness of an image based on an image signal obtained by photoelectrically converting an object image e.g. by an image pickup device, to set the same to an AF (autofocus) evaluation value, and controlling a focus lens position such that the AF evaluation value is maximized, to thereby achieve focus adjustment.

As the AF evaluation value, there is generally used a focusing voltage value of high-frequency components of an image signal extracted by a band-pass filter for passing a predetermined frequency range. In the case where a normal object image is shot, as shown in FIG. 10, the AF evaluation value increases as the image becomes more focused, and a focus lens position where the AF evaluation value is maximized is defined as an in-focus position.

However, as video cameras, there have been developed products which are capable of not only recording moving images in a magnetic tape but also recording still images in a memory. In such products, when a still image is recorded, control is provided such that the recording of the still image is inhibited until the AF control operation (focusing of the image) is completed.

In this case, there can be cases in which the AF control operation (focusing of the image) takes a long time, so that the recording of a still image is not permitted for a long time. Therefore, to avoid such an inconvenience, control is provided such that the recording of a still image is started when a predetermined time period (AF focusing waiting time period) has elapsed.

However, in a conventional video camera in which the shutter speed can be set low, a sampling period at which the AF evaluation value is sampled becomes longer when the shutter speed is set low, which results in a considerable increase in focusing time by the AF (autofocusing). For this reason, a video camera capable of having the shutter speed set low and recording still images suffers from the problem that focusing can hardly be achieved within the above-mentioned predetermined time period (AF focusing waiting time period).

As a solution to this problem, it can be envisaged that in a still image recording mode, the sampling period of the AF evaluation value is shortened by increasing the shutter speed only during an AF operation. However, setting a low shutter speed is originally intended to cope with shooting an object of an extremely low illuminant, and if the shutter speed is increased in shooting such a dark object, an image signal indicative of a sufficient contrast cannot be obtained, which makes it impossible to achieve focusing.

SUMMARY OF THE INVENTION

It is an object of the present invention to provide a moving image pickup apparatus and a still image recording method for the apparatus, which are capable of focusing with accuracy, a program for implementing the method, and a storage medium storing the program.

It is another object of the present invention to provide a moving image pickup apparatus and a still image recording method for the apparatus, which are capable of attaining both enhanced focusing accuracy and increased chances of snapshooting, a program for implementing the method, and a storage medium storing the program.

To attain the above objects, in a first aspect of the present invention, there is provided a moving image pickup apparatus that is capable of changing an image pickup period thereof as well as recording a still image, comprising a determining device that determines a predetermined time period according to a designated image pickup period, an automatic focus adjusting device that is responsive to designation of still image recording, for carrying out automatic focus adjustment, a memory device, a first storage device that is operable when an in-focus state is obtained by the automatic focus adjusting device within the predetermined time period determined by the determining device, to store in the memory device a still image for which the in-focus state has been obtained, and a second storage device that is operable when the in-focus state is not obtained by the automatic focus adjusting device even after a lapse of the predetermined time period determined by the determining device, to store in the memory device a still image for which the in-focus state has not been obtained.

Preferably, the moving image pickup apparatus comprises a setting device that sets one of a first mode in which focusing has precedence and a second mode in which snapshooting has precedence, and a first control device that is operable when the first mode is set by the setting device and the still image recording is designated, to enable the automatic focus adjusting device and one of the first storage device and the second storage device.

More preferably, the moving image pickup apparatus comprises a second control device that is operable when the second mode is set by the setting device and the still image recording is designated, to store a still image for which the in-focus state has not been obtained, without enabling the automatic focus adjusting device.

Preferably, the image pickup period is set to a value related to a shutter speed.

More preferably, the predetermined time period is set longer as the shutter speed is lower.

To attain the above objects, in a second aspect of the present invention, there is provided a still image recording method applied to a moving image pickup apparatus having an automatic focus adjusting device and being capable of changing an image pickup period thereof as well as recording a still image, comprising a determining step of determining a predetermined time period according to a designated image pickup period, a starting step of causing the automatic focus adjusting device to start automatic focus adjustment when still image recording is designated, a first storage step of storing in-a memory device a still image for which an in-focus state has been obtained, when the in-focus state is obtained within the predetermined time period determined in the determining step, and a second storage step of storing in the memory device a still image for which the in-focus state has not been obtained, when the in-focus state is not obtained by the automatic focus adjusting device even after a lapse of the predetermined time period determined in the determining step.

Preferably, the still image recording method according to the second aspect of the present invention, the still image recording method comprises a setting step of setting one of a first mode in which focusing has precedence and a second mode in which snapshooting has precedence, and a first control step of causing the starting step and one of the first storage step and the second storage step to be executed, when the first mode is set in the setting step and the still image recording is designated.

To attain the above objects, in a third aspect of the present invention, there is provided a program for causing a computer to execute a still image recording method applied to a moving image pickup apparatus having an automatic focus adjusting device and being capable of changing an image pickup period thereof as well as recording a still image, comprising a determining module for determining a predetermined time period according to a designated image pickup period, a starting module for causing the automatic focus adjusting device to start automatic focus adjustment when still image recording is designated, a first storage module for storing in a memory device a still image for which an in-focus state has been obtained, when the in-focus state is obtained within the predetermined time period determined by the determining module, and a second storage module for storing in the memory device a still image for which the in-focus state has not been obtained, when the in-focus state is not obtained by the automatic focus adjusting device even after a lapse of the predetermined time period determined by the determining module.

To attain the above objects, in a fourth aspect of the present invention, there is provided a storage medium storing the program according to the third aspect of the present invention.

To attain the above objects, in a fifth aspect of the present invention, there is provided a moving image pickup apparatus that is capable of changing an image pickup period thereof as well as recording a still image, comprising a first focus adjusting device that carries out automatic focus adjustment during image pickup, a memory device, a first storage device that is responsive to designation of still image recording, for storing an image subjected to the automatic focus adjustment by the first focus adjusting device, in the memory device as a still image, when the image pickup period is longer than a predetermined period, a second focus adjusting device that is responsive to the designation of the still image recording, for carrying out automatic focus adjustment, when the image pickup period is not longer than the predetermined period, a second storage device that is operable when an in-focus state has been obtained by the second focus adjusting device within a predetermined time period, to store an image for which the in-focus state has been obtained by the second focus adjusting device, in the memory device as a still image, and a third storage device that is operable when the in-focus state has not been obtained by the second focus adjusting device within the predetermined time period, to store an image obtained by the second focus adjusting device when the predetermined time period has elapsed, in the memory device as a still image.

To attain the above objects, in a sixth aspect of the present invention, there is provided a moving image pickup apparatus that is capable of changing an image pickup period thereof as well as recording a still image, comprising a first focus adjusting device that carries out automatic focus adjustment during image pickup, a second focus adjusting device that carries out automatic focus adjustment when still image recording is performed, a memory device, a setting device that sets as a processing mode to be executed, a selected one of a first processing mode in which an image for which an in-focus state has been obtained by the second focus adjusting device is stored in the memory device as a still image, when the still image recording is designated and the in-focus state has been obtained by the second focus adjusting device within a predetermined time period, or an image obtained by the second focus adjusting device when the predetermined time period has elapsed is stored in the memory device as a still image, when the still image recording is designated and the in-focus state has not been obtained by the second focus adjusting device within the predetermined time period, and a second processing mode in which an image subjected to the automatic focus adjustment by the first focus adjusting device is stored in the memory device as a still image when the still image recording is designated, and a control device that causes the second processing mode to be executed irrespective of settings made by the setting device, when the image pickup period is longer than a predetermined period.

Preferably, in the moving image pickup apparatus according to the first or sixth aspect of the present invention, the image pickup period is set to a value related to a shutter speed.

More preferably, the predetermined time period is set longer as the shutter speed is lower.

To attain the above objects, in a seventh aspect of the present invention, there is provided a still image recording method applied to a moving image pickup apparatus that is capable of changing an image pickup period thereof as well as recording a still image, comprising a first focus adjusting step of carrying out automatic focus adjustment during image pickup, a first storage step of storing an image subjected to the automatic focus adjustment in the first focus adjusting step, in a memory device as a still image, in response to designation of still image recording, when the image pickup period is longer than a predetermined period, a second focus adjusting step of carrying out automatic focus adjustment in response to the designation of the still image recording, when the image pickup period is not longer than the predetermined period, a second storage step of storing an image for which an in-focus state has been obtained in the second focus adjusting step, in the memory device as a still image, when the in-focus state has been obtained in the second focus adjusting step within a predetermined time period, and a third storage step of storing an image obtained in the second focus adjusting step when the predetermined time period has elapsed, in the memory device as a still image, when the in-focus state has not been obtained in the second focus adjusting step within the predetermined time period.

To attain the above objects, in an eighth aspect of the present invention, there is provided a still image recording method applied to a moving image pickup apparatus that includes a first focus adjusting device that carries out automatic focus adjustment during image pickup, and a second focus adjusting device that carries out automatic focus adjustment when still image recording is performed, the moving image pickup apparatus being capable of changing an image pickup period thereof as well as recording a still image, the method comprising a setting step of setting as a processing mode to be executed, a selected one of a first processing mode in which an image for which an in-focus state has been obtained by the second focus adjusting device is stored in a memory device as a still image, when the still image recording is designated and the in-focus state has been obtained by the second focus adjusting device within a predetermined time period, or an image obtained by the second focus adjusting device when the predetermined time period has elapsed is stored in the memory device as a still image, when the still image recording is designated and the in-focus state has not been obtained by the second focus adjusting device within the predetermined time period, and a second processing mode in which an image subjected to the automatic focus adjustment by the first focus adjusting device is stored in the memory device as a still image when the still image recording is designated, and a control step of causing the second processing mode to be executed irrespective of settings made in the setting step, when the image pickup period is longer than a predetermined period.

To attain the above objects, in a ninth aspect of the present invention, there is provided a program for causing a computer to execute a still image recording method applied to a moving image pickup apparatus that is capable of changing an image pickup period thereof as well as recording a still image, comprising a first focus adjusting module for carrying out automatic focusing adjustment during image pickup, a first storage module for storing an image subjected to the automatic focus adjustment by the first focus adjusting module, in a memory device as a still image, in response to designation of still image recording, when the image pickup period is longer than a predetermined period, a second focus adjusting module for carrying out automatic focus adjustment in response to the designation of the still image recording, when the image pickup period is not longer than the predetermined period, a second storage module for storing an image for which an in-focus state has been obtained by the second focus adjusting module, in the memory device as a still image, when the in-focus state has been obtained by the second focus adjusting module within a predetermined time period, and a third storage module for storing an image obtained by the second focus adjusting module when the predetermined time period has elapsed, in the memory device as a still image, when the in-focus state has not been obtained by the second focus adjusting module within the predetermined time period.

To attain the above objects, in a tenth aspect of the present invention, there is provided a program for causing a computer to execute a still image recording method applied to a moving image pickup apparatus that includes a first focus adjusting device that carries out automatic focus adjustment during image pickup, and a second focus adjusting device that carries out automatic focus adjustment when still image recording is performed, the moving image pickup apparatus being capable of changing an image pickup period thereof as well as recording a still image, the program comprising a setting module for setting as a processing mode to be executed, a selected one of a first processing mode in which an image for which an in-focus state has been obtained by the second focus adjusting device is stored in a memory device, as a still image, when the still image recording is designated and the in-focus state has been obtained by the second focus adjusting device within a predetermined time period, or an image obtained by the second focus adjusting device when the predetermined time period has elapsed is stored in the memory device as a still image, when the still image recording is designated and the in-focus state has not been obtained by the second focus adjusting device within the predetermined time period, and a second processing mode in which an image subjected to the automatic focus adjustment by the first focus adjusting device is stored in the memory device, as a still image when the still image recording is designated, and a control module for causing the second processing mode to be executed irrespective of settings made by the setting module, when the image pickup period is longer than a predetermined period.

To attain the above objects, in an eleventh aspect of the present invention, there is provided a storage medium storing the program according to the ninth aspect of the present invention.

To attain the above objects, in a twelfth aspect of the present invention, there is provided a storage medium storing the program according to the tenth aspect of the present invention.

The above and other objects, features, and advantages of the present invention will become more apparent from the following detailed description taken in conjunction with the following drawings.

DETAILED DESCRIPTION OF THE PREFERRED EMBODIMENTS

The present invention will be described in detail with reference to the drawings showing preferred embodiments thereof.

Figure 1:
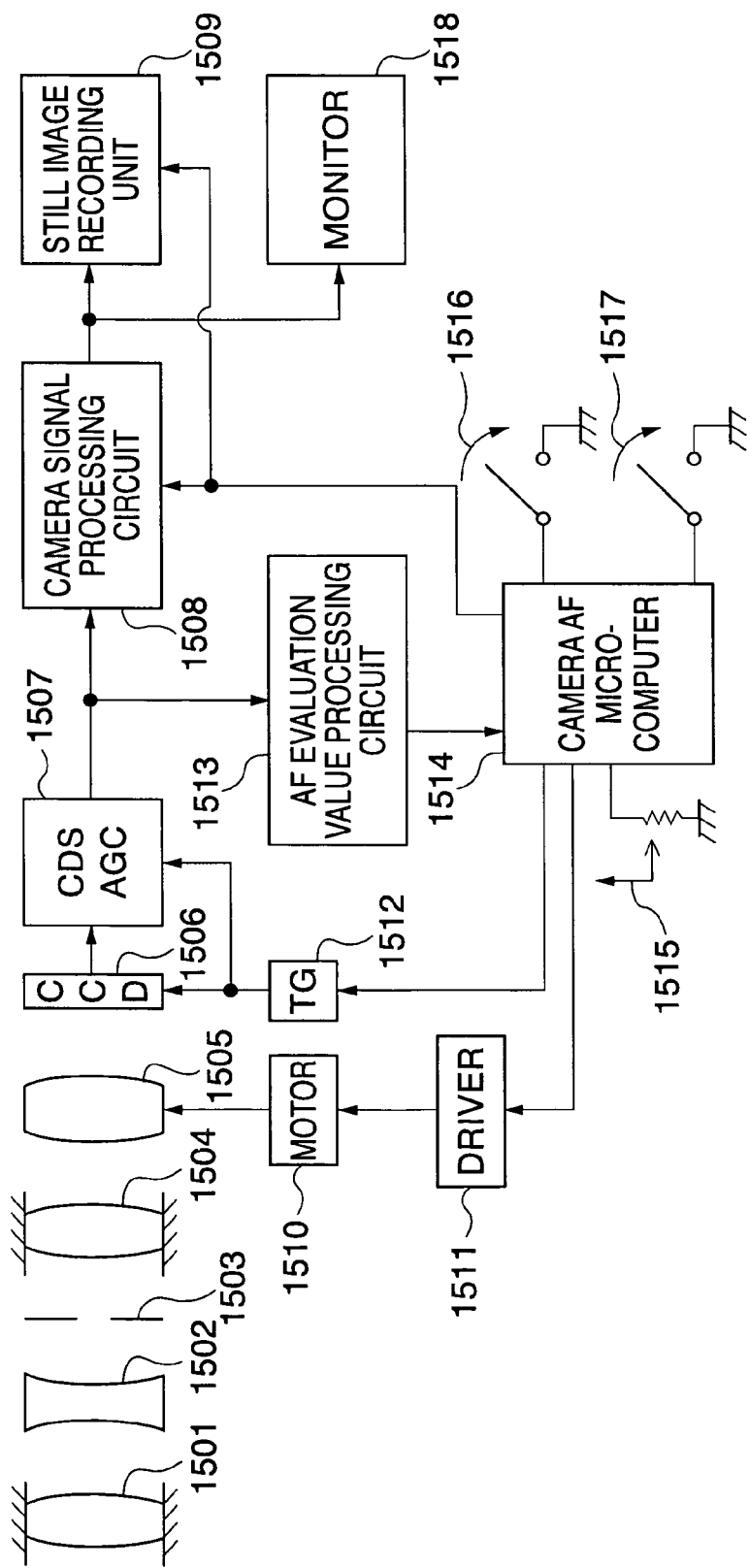
FIG. 1 is a block diagram showing the arrangement of a moving image pickup apparatus (video camera) according to a first embodiment of the present invention.

FIG. 1 is a block diagram showing the arrangement of a moving image pickup apparatus (video camera) according to a first embodiment of the present invention. The moving image pickup apparatus is a video camera capable of setting a low shutter speed (i.e. a long image pickup period) as well as of recording still images.

In FIG. 1, reference numeral 1501 designates a first fixed lens group, 1502 a variable power lens that performs a variable power or zooming operation, 1503 a diaphragm, 1504 a second fixed lens group, and 1505 a focus compensation lens (hereinafter simply referred to as "the focus lens"). The focus lens 1505 has a function of correcting deviation of a focal plane due to a variable power operation as well as a focusing function. Reference numeral 1506 designates a CCD as an image pickup device, and 1507 a CDS/AGC. The CDS/AGC 1507 samples the output from the CCD 1506 and performs gain adjustment. Reference numeral 1508 designates a camera signal processing circuit that processes an output signal from the CDS/AGC 1507 into a signal compatible with a still image recording unit 1509. The still image recording unit 1509 is implemented by a semiconductor memory.

Reference numeral 1510 designates a motor as an actuator for moving the focus lens 1505. Reference numeral 1511 designates a driver that drives the motor 1510 in response to a signal from a camera AF microcomputer 1514, referred to hereinafter. Reference numeral 1512 designates a timing generator (hereinafter referred to as "the TG") that generates pulses for driving the CCD 1506 based on settings by the camera AF microcomputer 1514. Reference numeral 1513 designates an AF evaluation value processing circuit that extracts high-frequency components, which are used for focus detection, from an output signal from the CDS/AGC 1507.

The camera AF microcomputer 1514 controls the driver 1511 based on an output signal from the AF evaluation value processing circuit 1513 to drive the focus lens 1505. Further, the camera AF microcomputer 1514 performs electronic shutter control by modifying configuration data of the TG 1512 in response to an input operation to a shutter speed switch 1515. Furthermore, when a still image capturing switch 1516 is depressed, the camera AF microcomputer 1514 outputs a still image capturing command to the still image recording device 1509 using a procedure corresponding to a mode selectively configured via an AF mode switch 1517. The shutter speed switch 1515 sets the shutter speed of the electronic shutter. The still image capturing switch 1516 is depressed by a user when he/she wants to capture a still image. The AF mode switch 1517 is for use in setting one of an AF priority mode and a shutter priority mode, both of which will be described hereinafter, so as to capture a still image. Reference numeral 1518 designates a monitor. An image is displayed on the monitor 1518 based on the output signal from the camera signal processing circuit 1508, to enable the photographer to monitor the image.

Next, a detailed description will be given of AF control carried out for a monitoring screen of the monitor 1518 by the camera AF microcomputer 1514, with reference to FIGS. 2 to 6.

Figure 2:
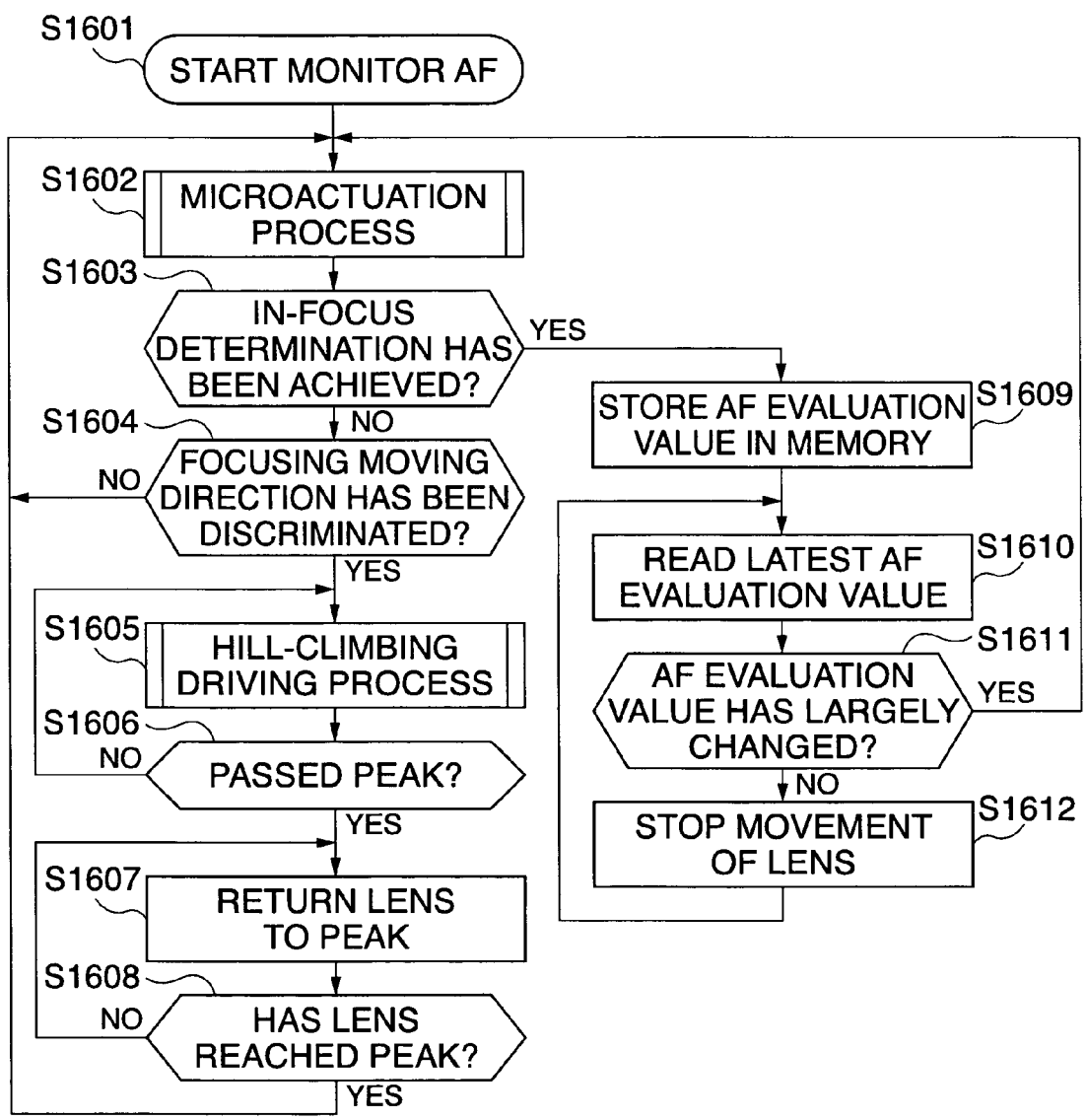
FIG. 2 is a flowchart showing an AF process for a monitor, which is carried out by a camera AF microcomputer appearing in FIG. 1.

FIG. 2 is a flowchart showing the AF process for the monitoring screen, which is carried out by the camera AF microcomputer 1514 in FIG. 1.

A step S1601 shows the start of the AF process.

In a step S1602, the camera AF microcomputer 1514 carries out a microactuation process for microactuation of the focus lens 1505. This step will be described in detail hereinafter with reference to FIG. 3.

In a step S1603, it is determined whether or not in-focus determination has been achieved as a result of the microactuation process in the step S1602. If it is determined that in-focus determination has been achieved, the process proceeds to a step S1609, and an in-focus/restart determination process is carried out in the steps S1609 et seq., whereas if it is determined that the in-focus determination has not been achieved, the process proceeds to a step S1604.

In the step S1604, it is determined whether or not the moving direction of the focus lens 1505 has been discriminated as a focusing direction, as the result of execution of the microactuation process in the step S1602. If it is determined that the moving direction of the focus lens 1505 has been discriminated as a focusing direction, the process proceeds to a step S1605, wherein a hill-climbing driving process is carried out. On the other hand, if it is determined that the moving direction of the focus lens 1505 has not been discriminated as a focusing direction, the process returns to the step S1602, wherein the microactuation process is continued.

In the step S1605, the hill-climbing driving process is carried out in which the focus lens 705 is driven at a high speed in a hill-climbing manner in the direction of increasing the AF evaluation value. This step will be described in detail hereinafter with reference to FIG. 5.

In a step S1606, it is determined whether or not the AF evaluation value has passed a peak in the hill-climbing driving process in the step S1605. If it is determined that the AF evaluation value has passed a peak, the process proceeds to a step S1607, whereas if it is determined that the AF evaluation value has not passed a peak, the process returns to the step S1605, wherein the hill-climbing driving process is continued.

In the step S1607, the focus lens 1505 is returned to the focus lens position where the AF evaluation value became maximum during execution of the hill-climbing driving process. In a step S1608, it is determined whether or not the focus lens 1505 has reached the peak focus lens position by the driving. If the focus lens 1505 has reached the peak focus lens position by execution of the step S1607, the process returns to the step S1602, wherein the microactuation process is resumed. On the other hand, if the focus lens 1505 has not reached the peak focus lens position, the process returns to the step S1607, wherein the operation of driving the focus lens 1505 to the peak focus lens position is continued.

Next, a description will be given of the focus/restart determination processes executed in the steps S1609 et seq.

In the step S1609, the camera AF microcomputer 1514 stores an AF evaluation value at the in-focus point in the memory.

In a step S1610, the latest AF evaluation value is read.

In a step S1611, the AF evaluation value stored in the step S1609 and the latest AF evaluation value read in the step S1610 are compared with each other, and it is determined whether or not the AF evaluation value has largely changed. If it is determined that the AF evaluation value has largely changed, the process returns to the step S1602, wherein the microactuation process is resumed. On the other hand, if it is determined that the AF evaluation value has not largely changed, the process proceeds to a step S1612.

In the step S1612, the movement of the focus lens 1505 is stopped, followed by the process returning to the step S1610. Thereafter, the focus/restart determination processes is continued in the steps S1610 et seq.

Figure 3:
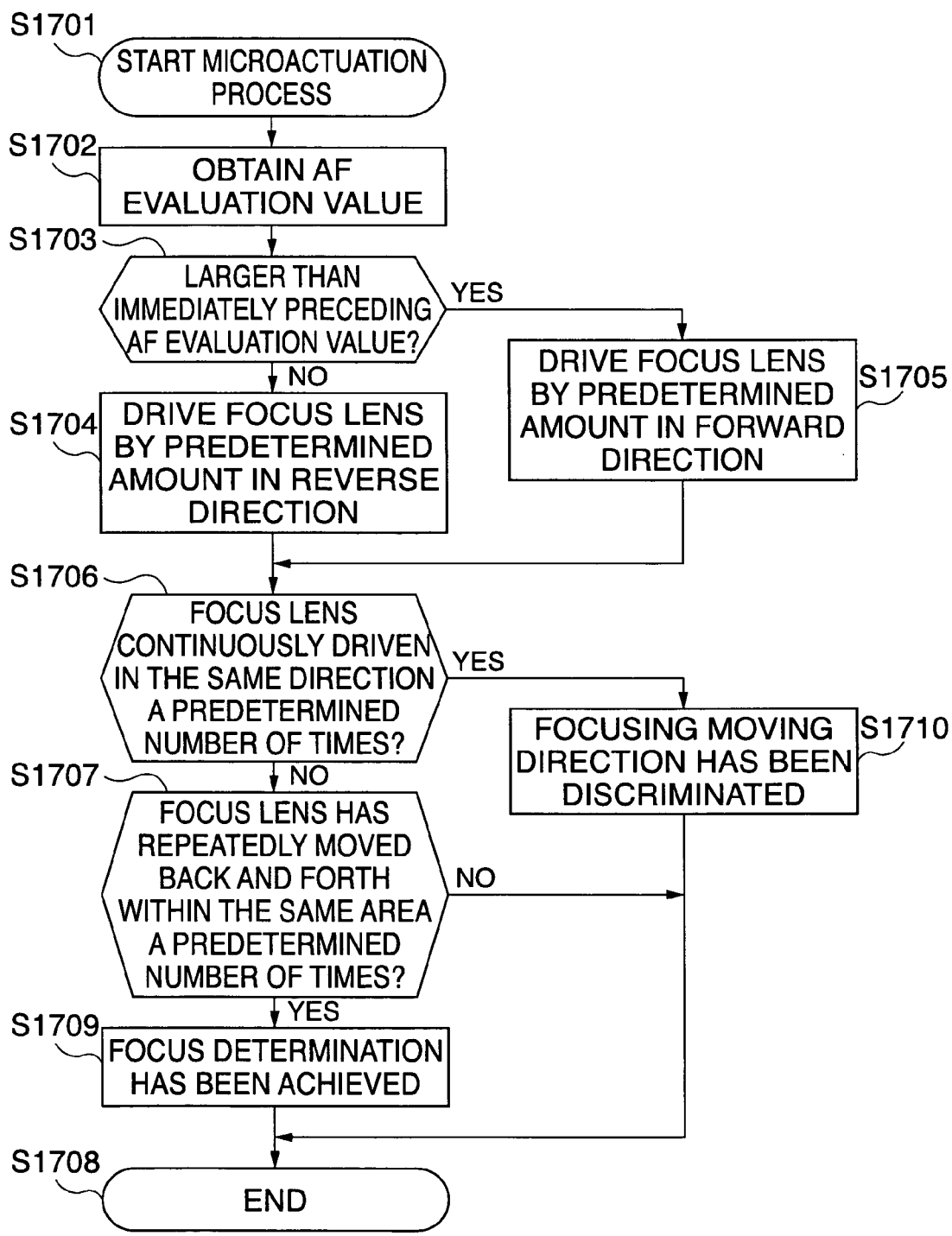
FIG. 3 is a flowchart showing a microactuation process executed in a step S1602 in FIG. 2.

FIG. 3 is a flowchart showing the microactuation process executed in the step S1602 in FIG. 2.

A step S1701 shows the start of the process.

In a step S1702, the camera AF microcomputer 1514 reads an AF evaluation-value from the AF evaluation value processing circuit 1513.

In a step S1703, it is determined whether or not the AF evaluation value read in the step S1702 is larger than the immediately preceding AF evaluation value read in the immediately preceding loop. If it is determined that the AF evaluation value read in the step S1702 is larger than the immediately preceding. AF evaluation value, the process proceeds to a step S1705, whereas if the AF evaluation value read in the step S1702 is not larger than the same, the process proceeds to a step S1704.

In the step S1704, the focus lens 1505 is driven by a predetermined amount in the reverse direction to the driving direction in the immediately preceding loop. On the other hand, in the step S1705, the focus lens 1505 is driven by a predetermined amount in the same direction as the driving direction in the immediately preceding loop.

In a step S1706, it is determined whether or not the focus lens 1505 has been continuously driven in the same direction a predetermined number of times. If the focus lens 1505 has been continuously driven in the same direction the predetermined number of times, the process proceeds to a step S1710, whereas if not, the process proceeds to a step S1707.

In the step S1707, it is determined whether or not the focus lens 1505 has repeatedly moved back and forth within the same area a predetermined number of times. If it is determined that the focus lens 1505 has repeatedly moved back and forth the predetermined number of times within the same area, the process proceeds to a step S1709. On the other hand, if it is determined that the focus lens 1505 has not repeatedly moved back and forth within the same area the predetermined number of times, the process proceeds to a step S1708 and is then terminated.

In the step S1709, it is judged that in-focus determination has been achieved (this makes the answer to the question of the step S1603 in FIG. 2 affirmative (YES)), and the process proceeds to the step S1708 and is then terminated.

In the step S1710, it is judged that the moving direction of the focus lens 1505 has been discriminated as a focusing direction (this makes the answer to the question of the step S1604 in FIG. 2 affirmative (YES)), and the process proceeds to the step S1708 and is then terminated.

Figure 4:
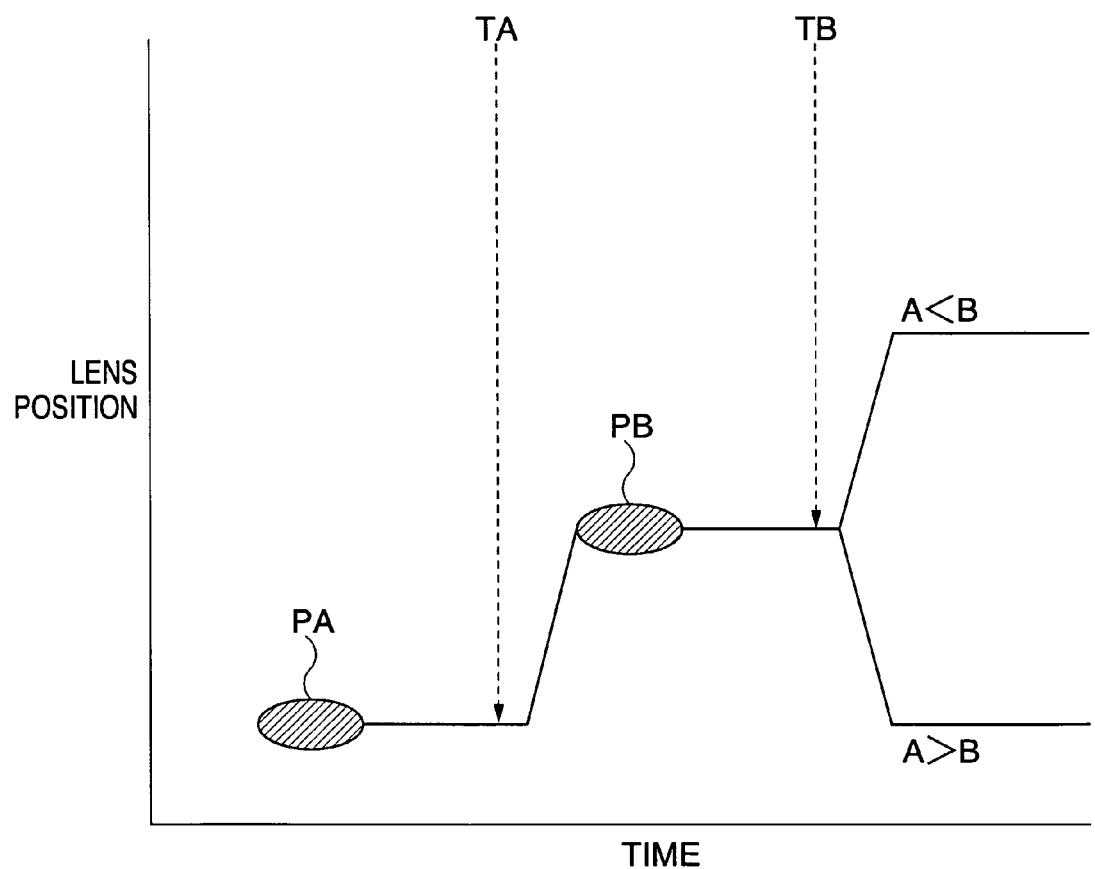
FIG. 4 is a diagram useful in explaining the relationship between the lens position of a focus lens and time.

FIG. 4 is a diagram useful in explaining the relationship between the lens position of the focus lens 1505 and time. The illustrated example corresponds to the processing executed in the steps S1702 to S1705 in FIG. 3.

An AF evaluation value "A" corresponding to an electric charge accumulated in the CCD 1506 at a lens position PA is read at a time point TA, and an AF evaluation value "B" corresponding to an electric charge accumulated in the CCD 1506 at a lens position PB is read at a time point TB. At the time point TB, the AF evaluation values A and B are compared. If A<B holds, the focus lens 1505 is continuously moved in the forward direction, whereas if A>B holds, the focus lens 1505 is moved in the reverse direction.

Figure 5:
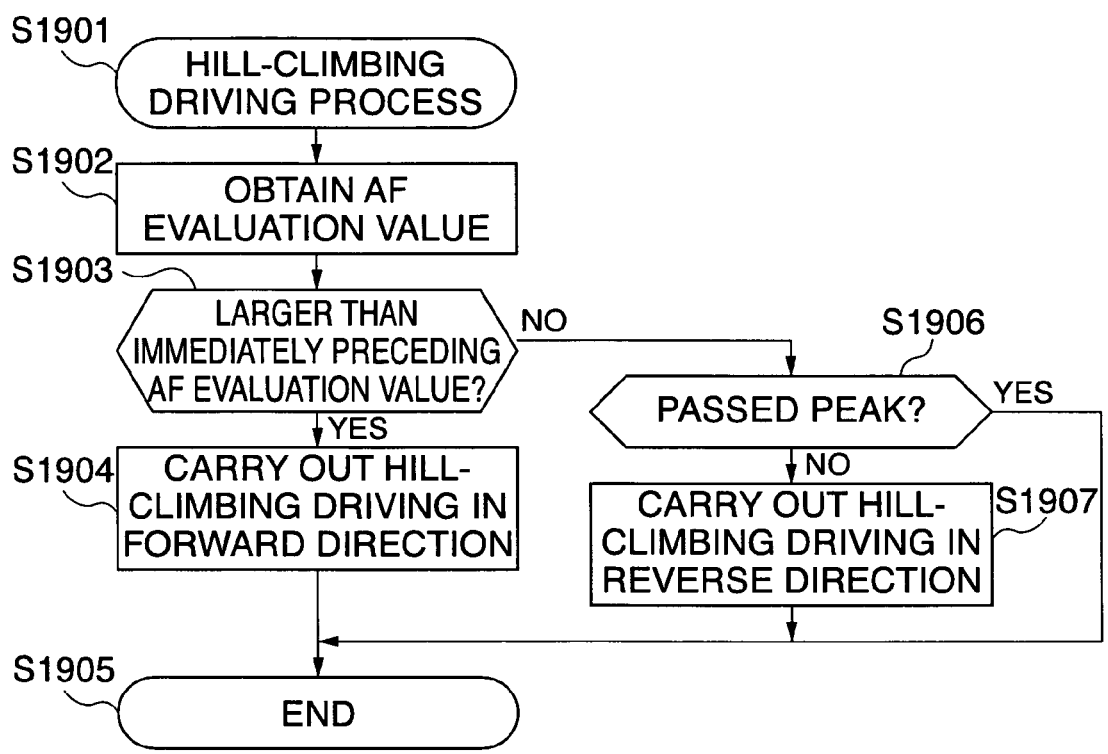
FIG. 5 is a flowchart showing a hill-climbing driving process executed in a step S1605 in FIG. 2.

FIG. 5 is a flowchart showing details of the hill-climbing driving process executed in the step S1605 in FIG. 2.

A step S1901 shows the start of the process.

In a step S1902, the camera AF microcomputer 1514 reads an AF evaluation value from the AF evaluation value processing circuit 1513.

In a step S1903, it is determined whether or not the AF evaluation value read in the step S1902 is larger than the immediately preceding AF evaluation value read in the immediately preceding loop. If it is determined that the AF evaluation value read in the step S1902 is larger than the immediately preceding value, the process proceeds to a step S1904, whereas if not, the process proceeds to a step S1906.

In the step S1904, the focus lens 1505 is driven at a predetermined speed in the same direction as the driving direction in the immediately preceding loop, and then the process proceeds to a step S1905 and is then terminated.

On the other hand, in the step S1906, it is determined whether or not the AF evaluation value has decreased after passing a peak. If it is determined that the AF evaluation value has not decreased after passing a peak, the process proceeds to a step S1907. On the other hand, if it is determined that the AF evaluation value has decreased after passing a peak, the process proceeds to the step S1905 and is then terminated.

In the step S1907, the focus lens 1505 is driven at a predetermined speed in the reverse direction to the driving direction in the immediately preceding loop, and then the process proceeds to the step S1905 and is then terminated.

Figure 6:
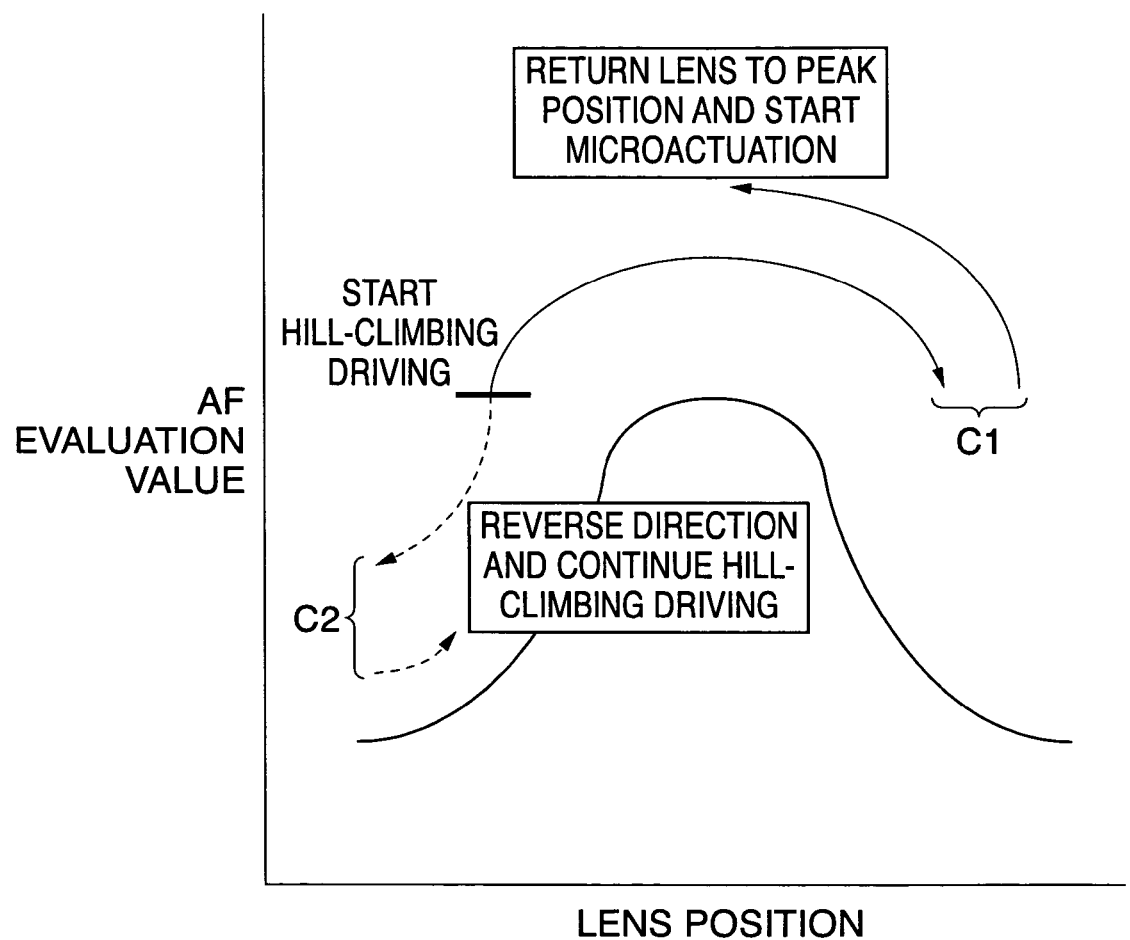
FIG. 6 is a diagram useful in explaining the relationship between the lens position and the AF evaluation value determined in association with each other when the focus lens is driven.

FIG. 6 is a diagram useful in explaining the relationship between the lens position of the focus lens 1505 and the AF evaluation value determined in association each other when the focus lens is driven. The illustrated example corresponds to the processing executed in FIG. 5.

In a case C1 where the AF evaluation value has decreased after passing a peak after the start of a hill-climbing driving, it is judged that the in-focus point has passed, and the hill-climbing driving process is stopped, followed by carrying out the microactuation process. On the other hand, in a case C2 where the AF evaluation value has simply decreased after the start of a hill-climbing driving, it is judged that the focus lens 1505 has been driven in a wrong direction. In this case, the driving direction is reversed, and the hill-climbing driving process is continued.

As described above, the camera AF microcomputer 1514 controls the lens position of the focus lens 1505 by repeatedly carrying out the sequence of processes of restart determination→microactuation→hill-climbing driving→microactuation→restart determination, such that the AF evaluation value is constantly maximized. Thus, the in-focus state of an image displayed on the monitor 1518 is maintained.

Next, a description will be given of the AF process executed when a still image is captured, with reference to FIG. 7.

Figure 7:
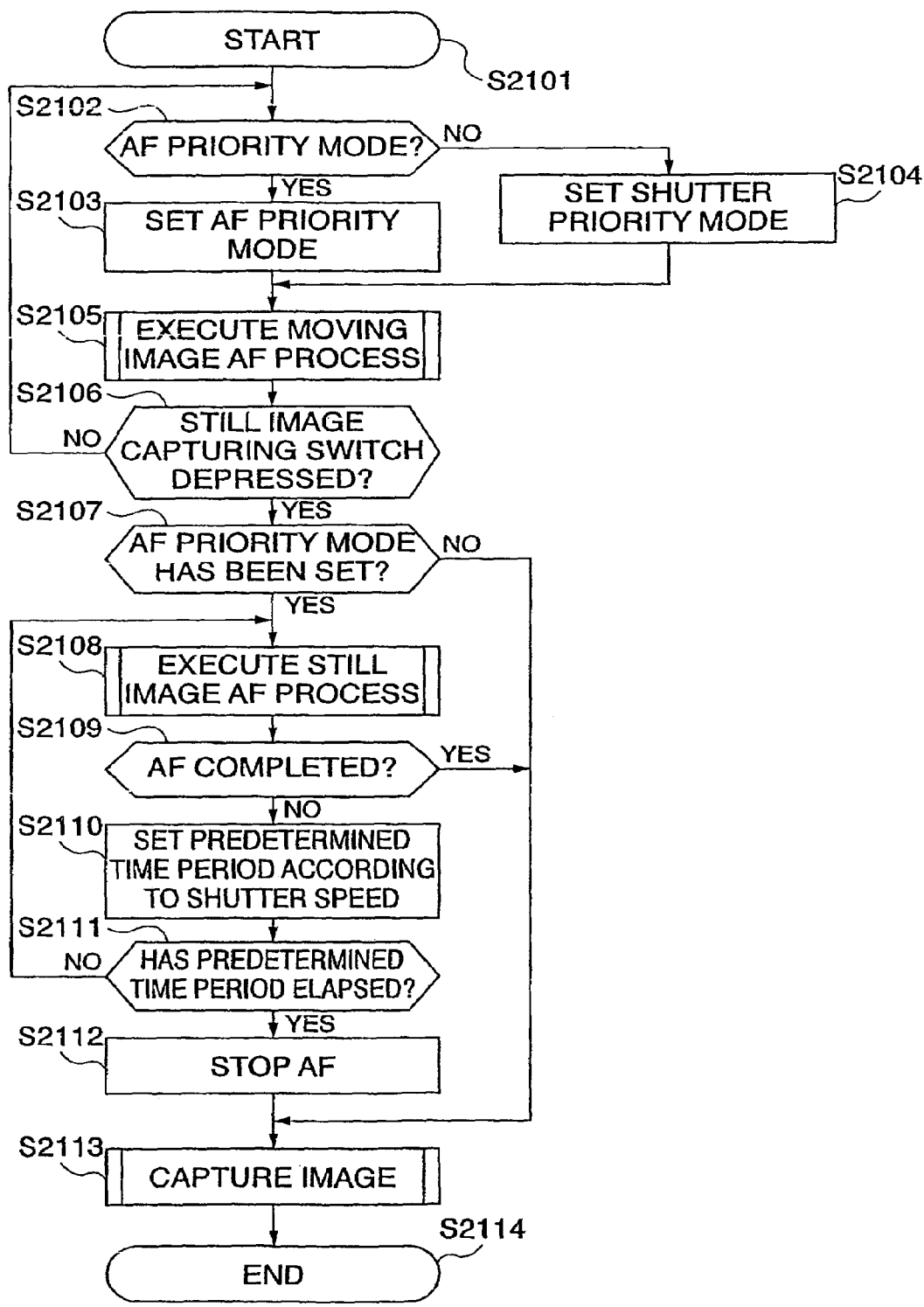
FIG. 7 is a flowchart showing an AF process carried out by the camera AF microcomputer, when a still image is captured.

FIG. 7 is a flowchart showing the AF process carried out by the camera AF microcomputer 1514, so as to capture a still image.

A step S2101 shows the start of the process.

In a step S2102, it is determined whether or not the AF priority mode has been selected by operation of the AF mode switch 1517, as a processing mode to be executed to capture a still image. If the AF priority mode has been selected, the process proceeds to a step S2103, wherein the AF priority mode is set. On the other hand, if the shutter priority mode has been selected, the process proceeds to a step S2104, wherein the shutter priority mode is set.

Now, a description will be given of the AF priority mode and the shutter priority mode. If a still image is to be shot with a high priority given to correct focusing over reduction of time required for shooting, it would be preferable to wait for accurate focusing to be achieved so as to shoot the image in focus. The AF priority mode is provided to this end, and in this mode an image is not captured, as a rule, until focusing is completed. On the other hand, if an object moving quickly, for example, is to be shot, a user cannot wait for accurate focusing to be achieved, and therefore there are also user needs for capturing an image upon depression of the shutter. The shutter priority mode is provided to meet the needs. Therefore, in the AF priority mode, after the still image capturing switch 1516 is depressed, a still image is captured when focusing is achieved or when a predetermined time period has elapsed after the depression of the still image capturing switch 1516 even though focusing is not yet achieved, whereas in the shutter priority mode, a still image is captured immediately after depression of the still image capturing switch 1516.

In a step S2105, a moving image AF process corresponding to the AF process for the monitoring screen, described hereinbefore with reference to FIGS. 2 to 6, is carried out.

In a step S2106, it is determined whether or not the still image capturing switch 1516 has been depressed. If it is determined that the still image capturing switch 1516 has been depressed, the process proceeds to a step S2107, whereas if it is determined that the still image capturing switch 1516 has not been depressed, the process returns to the step S2102.

In the step S2107, it is determined whether or not the AF priority mode has been set. If the AF priority mode has been set, the process proceeds to a step S2108, wherein the still image AF process is executed. This process will be described in detail hereinafter with reference to FIG. 8. On the other hand, if the shutter priority mode has been set, the process immediately proceeds to a step S2113, wherein a still image capturing command is issued, followed by terminating the present process (step S2114).

In a step S2109 following the step S2108, it is determined whether or not the still image AF process has been completed. If the still image AF process has been completed, the process proceeds to the step S2113, wherein the still image capturing command is issued, followed by terminating the present process (step S2114).

Figures 9, 10:
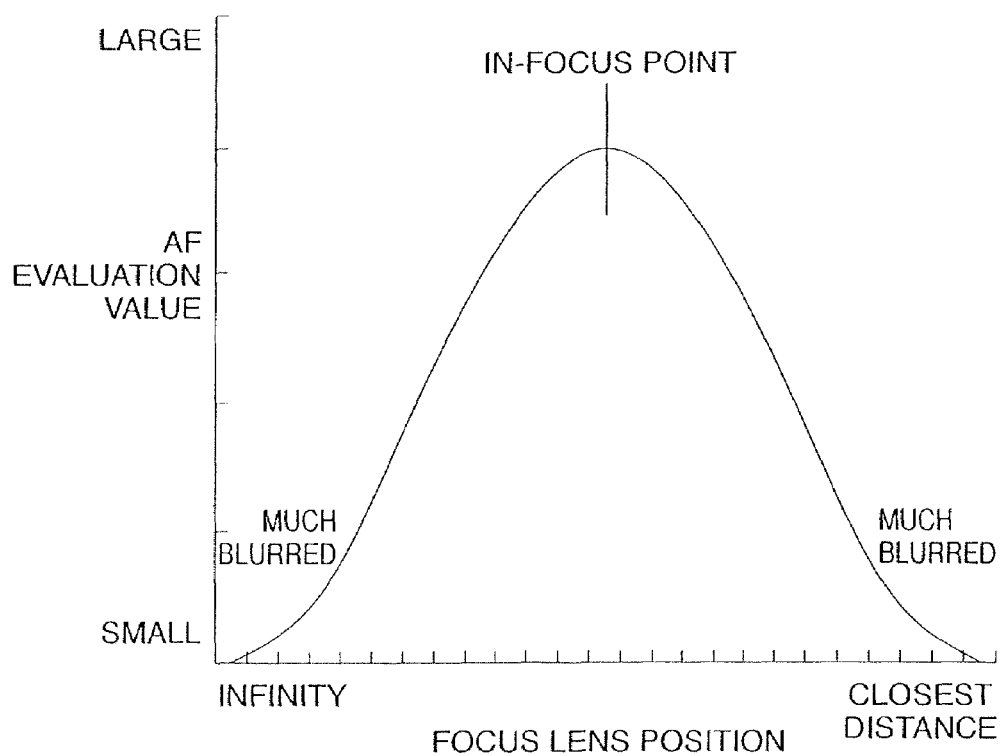
FIG. 9 is a diagram showing a table for use in determining a waiting time period according to shutter speed.
FIG. 10 is a diagram showing the relationship between the AF value and the lens position of the focus lens.

On the other hand, if the still image AF process has not been completed, the process proceeds to a step S2110, wherein a waiting time period (predetermined time period) is set over which forced execution of still image capturing is awaited when focusing is not achieved even after depression of the still image capturing switch 1516. The predetermined time period is determined, e.g. as shown in a table in FIG. 9, in accordance with the shutter speed set by an input operation carried out using the shutter speed switch 1515. More specifically, with reference to the default setting of a predetermined time period of 1.5 seconds at a shutter speed of 1/60 seconds, the predetermined time period is increased as the shutter speed becomes lower, allowing for an increase in required focusing time in accordance with reduction of the shutter speed.

In a step S2111, it is determined whether or not the predetermined time period set in the step S2110 has elapsed after depression of the still image capturing switch 1516. If it is determined that the predetermined time period has elapsed, the process proceeds to a step S2112, wherein the AF process is forcibly stopped. Then, the process proceeds to the step S2113, and the still image capturing command is issued, followed by terminating the present process.

If it is determined in the step S2111 that the predetermined time period has not elapsed, the process returns to the step S2108.

Since the AF focusing waiting time period (predetermined time period) is set in accordance with the shutter speed as described above (step S2110), an appropriate AF focusing waiting time period suitable for the shutter speed can be ensured, which increases the possibility of an image being captured at any shutter speed after focusing is completed. Even when focusing cannot be achieved, an image can be captured without unnecessary waiting time (steps S2112 and S2113). This makes it possible to attain both enhanced focusing accuracy and increased chances of snapshooting. The step S2110 may be provided between the step S2107 and the step S2108.

Figure 8:
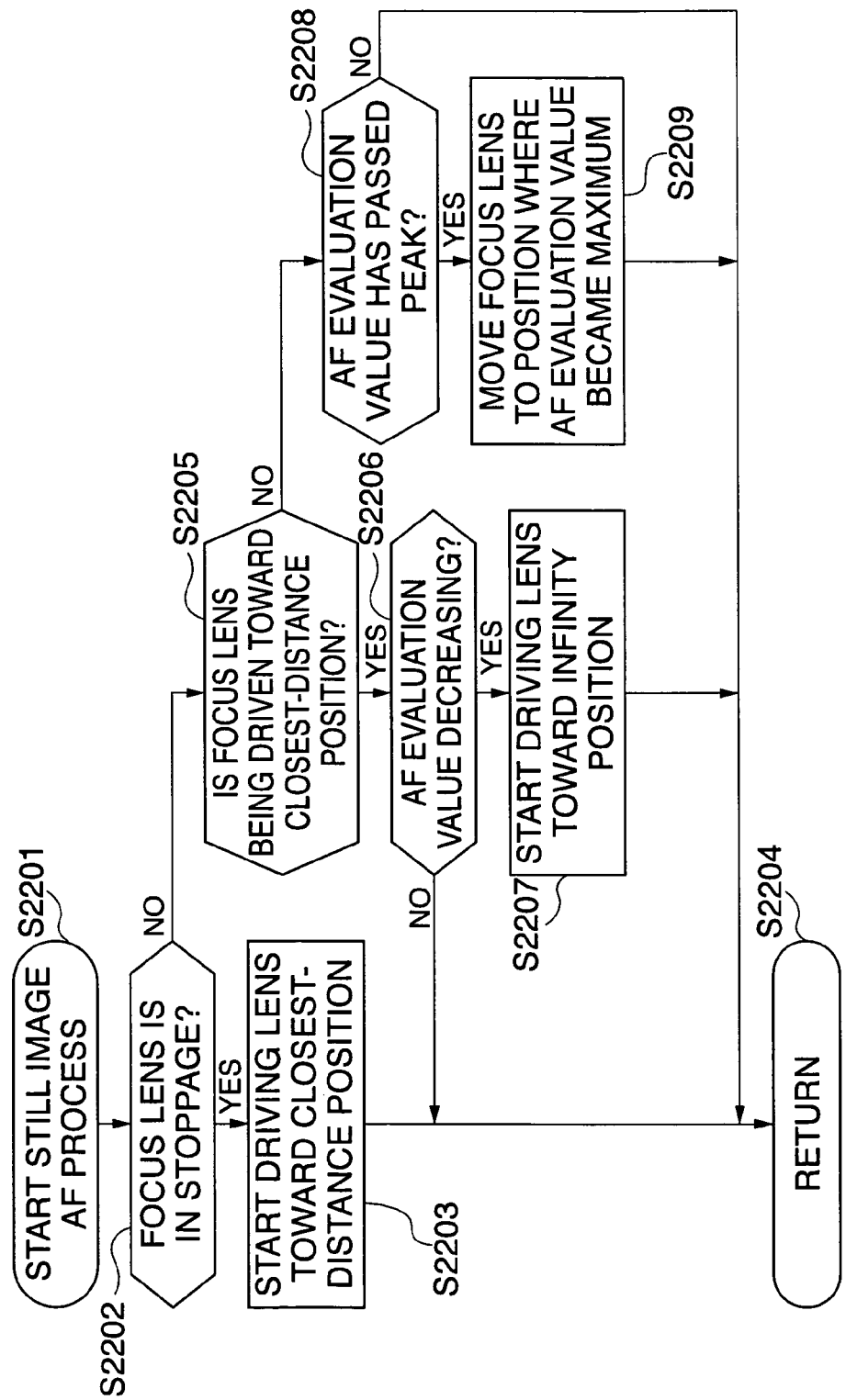
FIG. 8 is a flowchart showing a still image AF process executed in a step S2108 in FIG. 7.

FIG. 8 is a flowchart showing details of the process executed in the step S2108 in FIG. 7.

A step S2101 shows the start of the process.

In a step S2202, it is determined whether or not the focus lens 1505 is in stoppage. If the focus lens 1505 is in stoppage, the process proceeds to a step S2203, wherein driving of the focus lens 1505 toward the closest-distance position is started. Then, the process proceeds to a step S2204 and is then terminated.

On the other hand, in the step S2202, if the focus lens 1505 is being moved, the process proceeds to a step S2205, wherein it is determined whether or not the focus lens 1505 is being moved toward the closest-distance position. If the focus lens 1505 is being moved toward the closest-distance position, the process proceeds to a step S2206, wherein it is determined whether or not the AF evaluation value is on the decrease. If the AF evaluation value is on the decrease, the process proceeds to a step S2207, wherein driving of the focus lens 1505 toward the infinity position is started. Then, the process proceeds to the step S2204 and is then terminated.

On the other hand, if it is determined in the step S2206 that the AF evaluation value is not on the decrease, the process proceeds to the step S2204 and is then terminated.

If it is determined in the step S2205 that the focus lens 1505 is not being moved toward the closest-distance position, the process proceeds to a step S2208, wherein it is determined whether or not the AF evaluation value has passed a peak. If the AF evaluation value has passed a peak, the process proceeds to a step S2209, wherein the focus lens 1505 is moved to a position where the AF evaluation value became maximum, and stopped there. Then, the process proceeds to the step S2204 and is then terminated.

If it is determined in the step S2208 that the AF evaluation value has not passed a peak, the process proceeds to the step S2204 and is then terminated.

Thus, the focus lens 1505 can be quickly moved to the position where the AF evaluation value became maximum.

Figure 11:
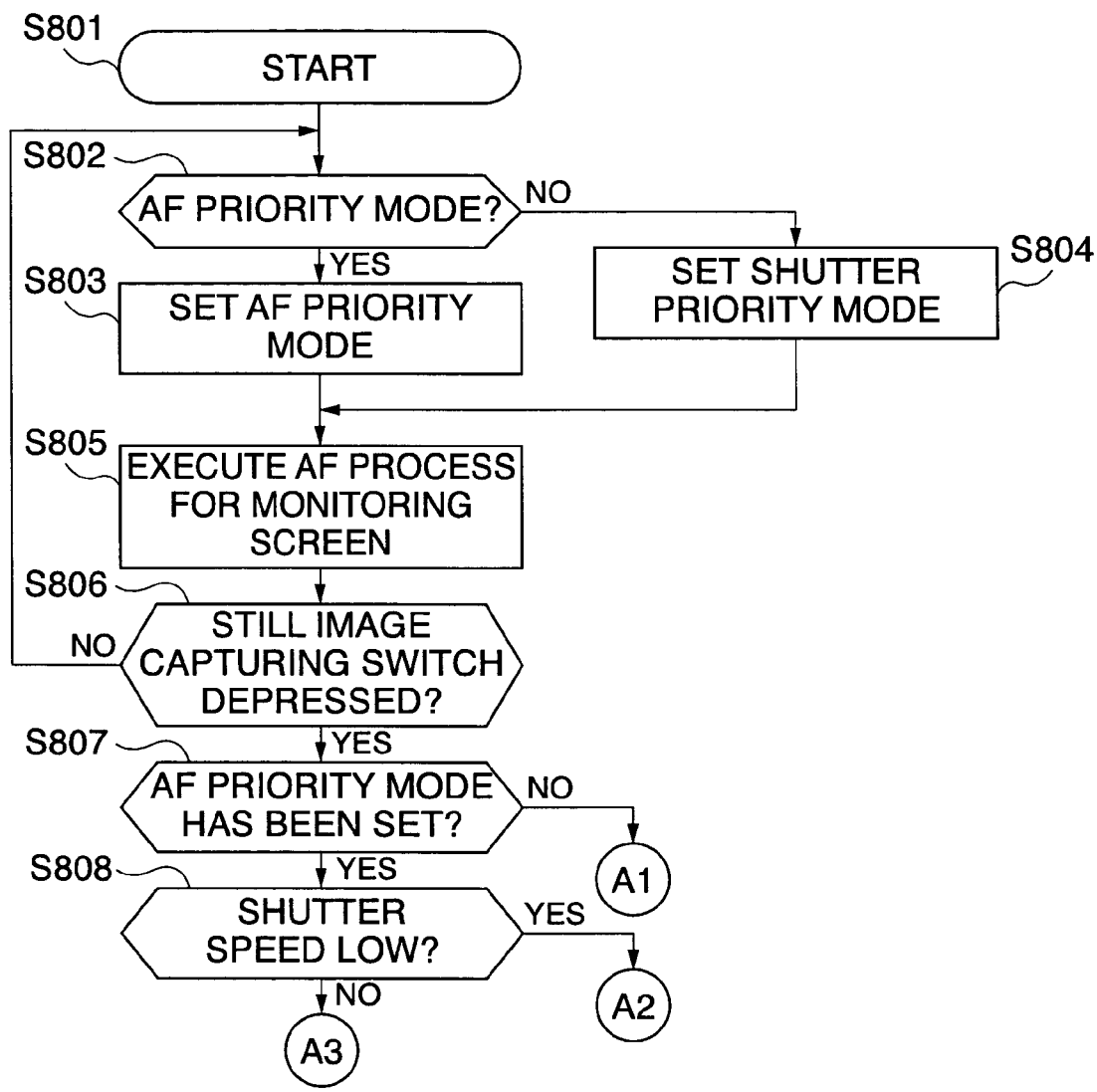
FIG. 11 is a flowchart showing an AF process carried out by a camera AF microcomputer of a moving image pickup apparatus according to a second embodiment of the present invention, when a still image is captured.
Figure 12:
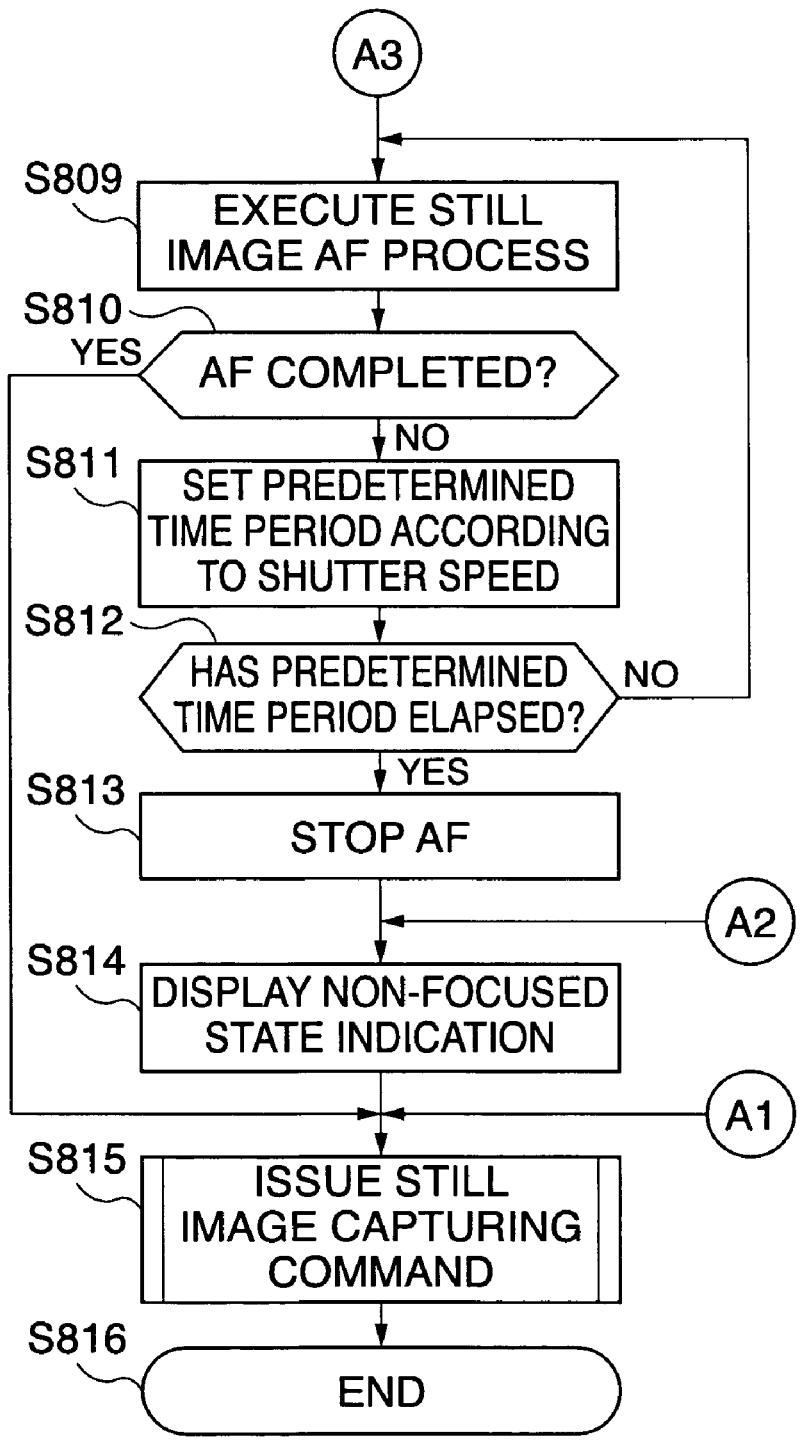
FIG. 12 is a flowchart showing a continued part of the AF process in FIG. 11.

FIGS. 11 and 12 are a flowchart showing an AF process executed by a camera AF microcomputer 1514 of a moving image pickup apparatus according to a second embodiment of the present invention, so as to capture a still image. It should be noted that the moving image pickup apparatus according to the second embodiment is identical in hardware configuration to the moving image pickup apparatus according to the first embodiment, and therefore illustration and description thereof are omitted, with the same reference numerals designating the same components.

A step S801 shows the start of the process.

In a step S802, it is determined whether or not the AF priority mode has been selected by operation of the AF mode switch 1517, as the processing mode to be executed to capture a still image. If the AF priority mode has been selected, the process proceeds to a step S803, wherein the AF priority mode is set. On the other hand, if the shutter priority mode has been selected, the process proceeds to a step S804, wherein the shutter priority mode is set.

Now, a description will be given of the AF priority mode and the shutter priority mode. In the AF priority mode, focusing is awaited within a predetermined time period, and as soon as a still image is focused, the image is captured (stored in a memory device), whereas if the predetermined time period has elapsed, the still image is immediately captured even though it is not focused. On the other hand, if a quickly moving object, for example, is to be shot, a user cannot wait for accurate focusing to be achieved, and since the focus lens 105 has already been brought close to the in-focus position by the AF process for the monitoring screen (FIG. 2), in the shutter mode, a still image is captured upon depression of the shutter. Therefore, in the AF priority mode, after the still image capturing switch 1516 is depressed, a still image is captured when focusing is achieved or when a predetermined time period has elapsed after the depression of the still image capturing switch 1516 even though focusing is not yet achieved, whereas in the shutter priority mode, a still image is captured immediately after depression of the still image capturing switch 1516.

In a step S805, the moving image AF process corresponding to the AF process for a monitoring screen, described hereinbefore with reference to FIGS. 2 to 6, is carried out.

In a step S806, it is determined whether or not the still image capturing switch 1516 has been depressed. If it is determined that the still image capturing switch 1516 has been depressed, the process proceeds to a step S807, whereas if it is determined that the still image capturing switch 1516 has not been depressed, the process returns to the step S802.

In the step S807, it is determined whether or not the AF priority mode has been set. If the AF priority mode has been set, the process proceeds to a step S808, whereas if the shutter priority mode has been set, the process immediately proceeds to a step S815, wherein a still image capturing command is issued, followed by terminating the present process (step S816).

In the step S808, the shutter speed input via the shutter speed switch 1515 is compared with a predetermined speed. The predetermined speed is set to a value (e.g. ¼ seconds) to be assumed when the focusing time becomes too long for the apparatus to be of practical use due to a long image pickup sampling period being set. If in the step S808, it is determined that the shutter speed is lower than the predetermined speed, the process proceeds to a step S814, wherein a non-focused state indication is carried out to display a message to the effect that "focusing is not attainable" on the monitor 1518 to inform the user of the non-focused state of the still image, and then the process proceeds to the step S815, wherein the still image capturing command is issued.

On the other hand, if it is determined in the step S808 that the shutter speed is not lower than the predetermined speed, the process proceeds to a step S809, wherein the still image AF process is carried out. The details of this process were described hereinabove with reference to FIG. 8.

In the step S810, it is determined whether or not the still image AF process has been completed. If the still image AF process has been completed, the process proceeds to the step S815, wherein the still image capturing command is issued, followed by terminating the present process (step S816).

On the other hand, if the still image AF process has not been completed, the process proceeds to a step S811, wherein a waiting time period (predetermined time period) is set over which forced execution of still image capturing is awaited when focusing is not achieved even after depression of the still image capturing switch 1516. The predetermined time period is determined, e.g. as shown in the table in FIG. 9, in accordance with the shutter speed set by an input operation carried out using the shutter speed switch 1515. More specifically, with reference to the default setting of a predetermined time period of 1.5 seconds at a shutter speed of 1/60 seconds, the predetermined time period is increased as the shutter speed becomes lower, allowing for an increase in required focusing time in accordance with reduction of the shutter speed.

In a step S812, it is determined whether or not the predetermined time period set in the step S811 has elapsed after depression of the still image capturing switch 1516. If it is determined that the predetermined time period has elapsed, the process proceeds to a step S813, wherein the AF process is forcibly stopped. Then, the process proceeds to the step S814, wherein the non-focused state indication is carried out to display a message to the effect that "focusing is not attainable" on the monitor 1518 to inform the user of the non-focused state of the image, and then the process proceeds to the step S815, wherein the still image capturing command is issued, followed by terminating the present process in the step S816.

If it is determined in the step S812 that the predetermined time period has not elapsed, the process returns to the step S809.

Thus, when the shutter speed is higher than the predetermined speed (NO to the step S808), completion of the still image AF process is awaited (steps S809 and S810) to thereby increase the possibility of capturing a still image which is focused to the possible maximum extent. On the other hand, if the shutter speed is lower than the predetermined speed (YES to the step S808), making the sampling period of the AF evaluation value so long that the AF focusing time becomes too long, capturing of a still image is carried out immediately (step S815) without waiting for completion of the still image AF process. This makes it possible to prevent chances of snapshooting from slipping away.

Even if the chances of snapshooting are prevented from slipping away at the cost of accuracy of focusing, this does not necessarily result in the capturing of a blurred image, since the AF process for the monitoring screen has already been carried out when the still image AF process is carried out and there is a high possibility of the focus lens 105 being positioned close to the in-focus point. The step S811 may be provided between the step S808 and the step S809.

Figure 13:
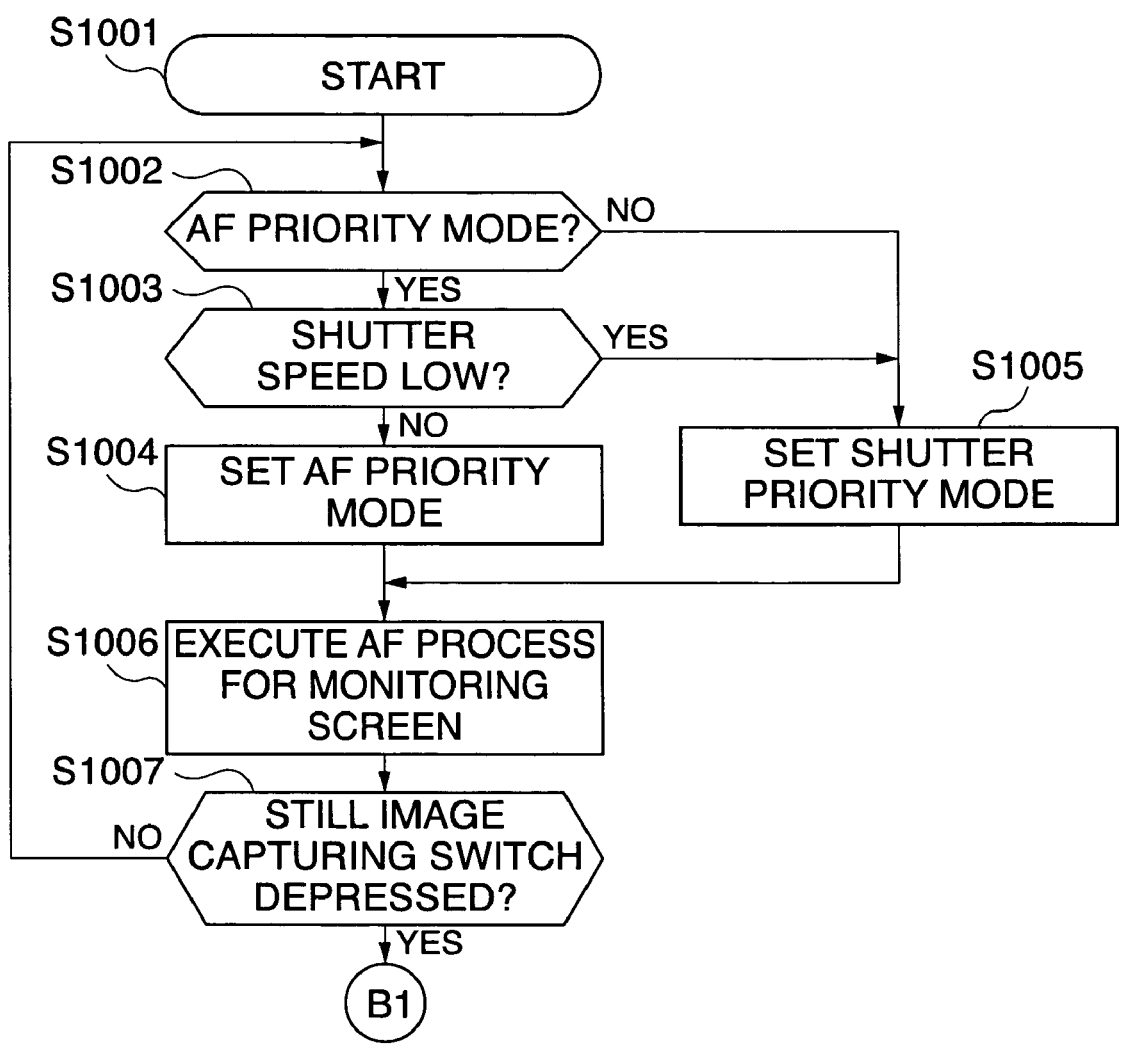
FIG. 13 is a flowchart showing an AF process carried out by a camera AF microcomputer of a moving image pickup apparatus according to a third embodiment of the present invention, when a still image is captured.
Figure 14:
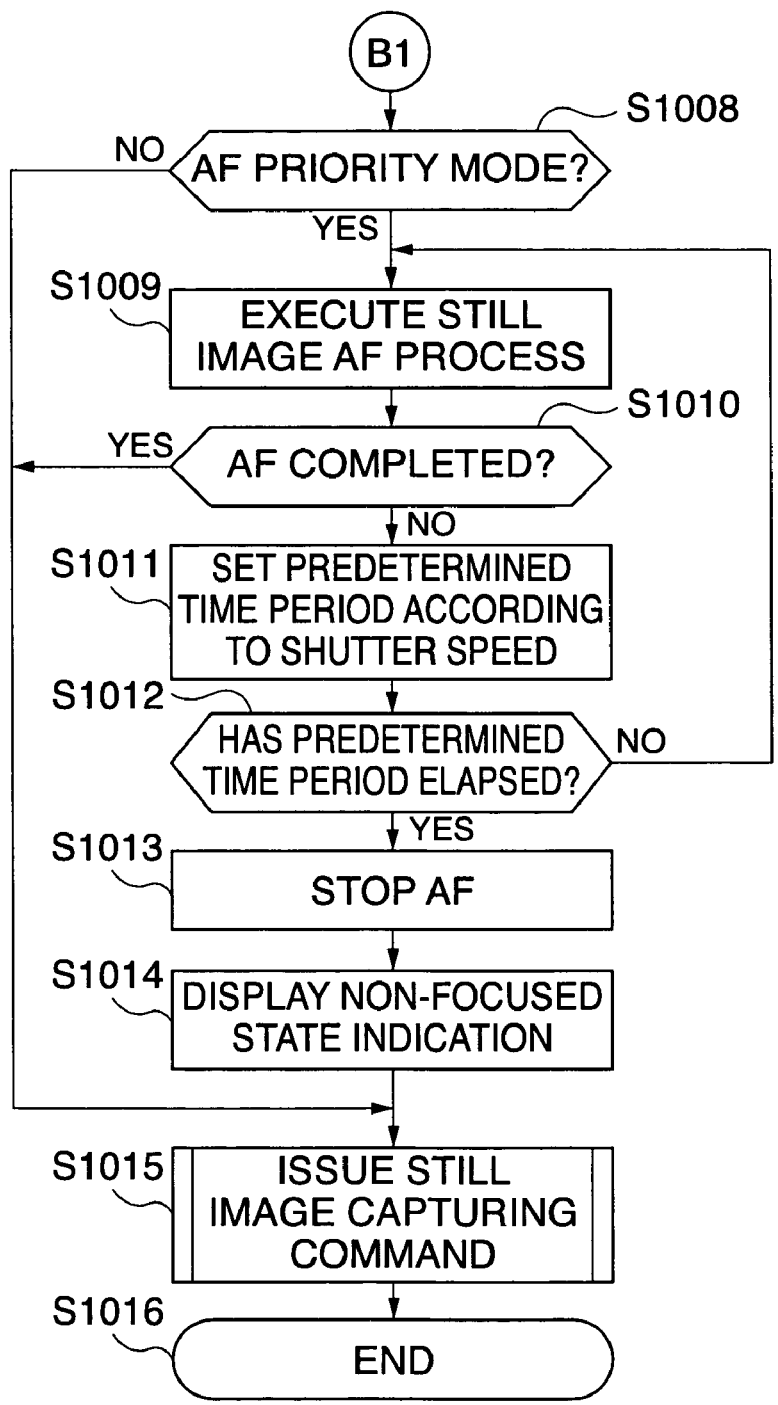
FIG. 14 is a flowchart showing a continued part of the AF process in FIG. 13.

FIGS. 13 and 14 are a flowchart showing an AF process executed by a camera AF microcomputer 1514 of a moving image pickup apparatus according to a third embodiment of the present invention, so as to capture a still image. It should be noted that the moving image pickup apparatus according to the third embodiment is identical in hardware configuration to the moving image pickup apparatus according to the first embodiment, and therefore illustration and description thereof are omitted, with the same reference numerals designating the same components.

A step S1001 shows the start of the process.

In a step S1002, it is determined whether or not the AF priority mode has been selected by operation of the AF mode switch 1517, as the processing mode to be executed to capture a still image. If the AF priority mode has been selected, the process proceeds to a step S1003, whereas if the shutter priority mode has been selected, the process proceeds to a step S1005.

In the step S1003, the shutter speed input via the shutter speed switch 1515 is compared with a predetermined speed. The predetermined speed is set to a value (e.g. ¼ seconds) to be assumed when the focusing time becomes too long for the apparatus to be of practical use due to a long image pickup sampling period being set. If it is determined in the step S1003 that the shutter speed is lower than the predetermined speed, it is difficult to carry out the AF process in the AF priority mode, so that the process proceeds to the step S1005, wherein the shutter priority mode is set.

On the other hand, it is determined in the step S1003 that the shutter speed is not lower than the predetermined speed, the process proceeds to a step S1004, wherein the AF priority mode is set.

The AF priority mode and the shutter priority mode are the same as those described hereinabove as to the second embodiment. That is, in the AF priority mode, after the still image capturing switch 1516 is depressed, a still image is captured when focusing is achieved or when a predetermined time period has elapsed after the depression of the still image capturing switch 1516 even though focusing is not yet achieved, whereas in the shutter priority mode, a still image is captured immediately after depression of the still image capturing switch 1516.

In a step S1006, the moving image AF process corresponding to the AF process of the first embodiment for the monitoring screen, described hereinbefore with reference to FIGS. 2 to 6, is carried out.

In a step S1007, it is determined whether or not the still image capturing switch 1516 has been depressed. If it is determined that the still image capturing switch 1516 has been depressed, the process proceeds to a step S1008, whereas if it is determined that the still image capturing switch 1516 has not been depressed, the process returns to the step S1002.

In the step S1008, it is determined whether or not the AF priority mode has been set. If the AF priority mode has been set, the process proceeds to a step S1009, wherein the still image AF process is executed. This process is the same as the still image AF process of the first embodiment described in detail hereinabove with reference to FIG. 9, and therefore detailed description thereof is omitted.

On the other hand, if the shutter priority mode has been set, the process immediately proceeds to a step S1015, wherein the still image capturing command is issued, followed by terminating the present process (step S1016).

In the step S1010 following the step S1009, it is determined whether or not the still image AF process has been completed. If the still image AF process has been completed, the process proceeds to the step S1015, wherein the still image capturing command is issued, followed by terminating the present process (step S1016).

On the other hand, if the still image AF process has not been completed, the process proceeds to a step S1011, wherein a waiting time period (predetermined time period) is set over which forced execution of still image capturing is awaited when focusing is not achieved even after depression of the still image capturing switch 1516. The predetermined time period is determined similarly to the first embodiment, e.g. as shown in the table in FIG. 9, in accordance with the shutter speed set by an input operation carried out using the shutter speed switch 1515. More specifically, with reference to the default setting of a predetermined time period of 1.5 seconds at a shutter speed of 1/60 seconds, the predetermined time period is increased as the shutter speed becomes lower, allowing for an increase in required focusing time in accordance with reduction of the shutter speed.

In a step S1012 following the step S1011, it is determined whether or not the predetermined time period set in the step S1011 has elapsed after depression of the still image capturing switch 1516. If it is determined that the predetermined time period has elapsed, the process proceeds to a step S1013, wherein the AF process is forcibly stopped. Then, the process proceeds to a step S1014, wherein the non-focused state indication is carried out to display a message to the effect that "focusing is not attainable" on the monitor 1518 to inform the use of the non-focused state of the image, and then the process proceeds to the step S1015, wherein the still image capturing command is issued, followed by terminating the present process in a step S1016.

If it is determined in the step S1012 that the predetermined time period has not elapsed, the process returns to the step S1009.

Thus, in the present embodiment, if the AF priority mode has been set, the shutter speed is compared with the predetermined speed. If, as a result of the comparison, the shutter speed is not lower than the predetermined speed, the still image AF process is carried out according to the settings in the AF priority mode, to thereby prevent an unfocused still image from being captured, to the possible maximum extent. On the other hand, if the shutter speed is lower than the predetermined speed, this means that the sampling period of the AF evaluation value is long, making the AF focusing time too long, and therefore without accepting the settings in the AF priority mode, the still image AF process is inhibited immediately after the operation of the still image capturing switch 1516, to thereby capture a still image immediately.

This makes it possible to prevent the chances of snapshooting from slipping away when the still images are captured. In the third embodiment as well, even if the chances of snapshooting are prevented from slipping away at the cost of accuracy of focusing as described above, this does not necessarily result in the capturing of blurred images, since the AF process for the monitoring screen has already been carried out when the still image AF process is started, with a high possibility of the focus lens 105 being positioned close to the in-focus point. The step S1011 may be provided between the step S1007 and the step S1008.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the object of the present invention may also be accomplished by supplying a system or an apparatus (e.g., a personal computer) with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network from another computer, a database or the like, not shown, connected to the Internet, a commercial network, a local area network, or the like.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

The present invention is not limited to the above embodiments and various changes and modifications can be made within the spirit and scope of the present invention. Therefore to apprise the public of the scope of the present invention, the following claims are made.

What is claimed is:

1. A moving image pickup apparatus that is capable of changing an image pickup period thereof as well as recording a still image, comprising:
    a determining device that determines a predetermined time period according to a designated image pickup period;
    an automatic focus adjusting device that is responsive to designation of still image recording, for carrying out automatic focus adjustment;
    a memory device; and
    a control device (i) that is operable when an in-focus state is obtained by said automatic focus adjusting device within the predetermined time period determined by said determining device, to store in said memory device a still image for which the in-focus state has been obtained, and (ii) that is operable when the in-focus state is not obtained by said automatic focus adjusting device even after a lapse of the predetermined time period determined by said determining device, to store in said memory device a still image for which the in-focus state has not been obtained.

2. A moving image pickup apparatus as claimed in claim 1, further comprising:
    a setting device that sets one of a first mode in which focusing has precedence and a second mode in which snapshooting has precedence,
    wherein the control device is operable when the first mode is set by said setting device and the still image recording is designated, to enable said automatic focus adjusting device and said storage device.

3. A moving image pickup apparatus as claimed in claim 2, wherein the control device is operable when the second mode is set by said setting device and the still image recording is designated, to store a still image for which the in-focus state has not been obtained, without enabling said automatic focus adjusting device.

4. A moving image pickup apparatus as claimed in claim 1, wherein the image pickup period is set to a value related to a shutter speed.

5. A moving image pickup apparatus as claimed in claim 4, wherein the predetermined time period is set longer as the shutter speed is reduced.

6. A still image recording method applied to a moving image pickup apparatus having an automatic focus adjusting device and being capable of changing an image pickup period thereof as well as recording a still image, comprising:
    a determining step of determining a predetermined time period according to a designated image pickup period;
    a starting step of causing the automatic focus adjusting device to start automatic focus adjustment when still image recording is designated;
    a first storage step of storing in a memory device a still image for which an in-focus state has been obtained, when the in-focus state is obtained within the predetermined time period determined in said determining step; and
    a second storage step of storing in the memory device a still image for which the in-focus state has not been obtained, when the in-focus state is not obtained by the automatic focus adjusting device even after a lapse of the predetermined time period determined in said determining step.

7. A still image recording method as claimed in claim 6, further comprising:
    a setting step of setting one of a first mode in which focusing has precedence and a second mode in which snapshooting has precedence, and
    a first control step of causing said starting step and one of said first storage step and said second storage step to be executed, when the first mode is set in said setting step and the still image recording is designated.

8. A moving image pickup apparatus that is capable of changing an image pickup period thereof as well as recording a still image, comprising:
    a focus adjusting device that carries out automatic focus adjustment during image pickup and that is responsive to the designation of the still image recording;
    a memory device;
    a control device that is responsive to designation of still image recording, (i) that is operable to store an image subjected to the automatic focus adjustment during image pickup by said focus adjusting device, in said memory device as a still image, when the image pickup period is longer than a first predetermined period, (ii) that is operable when an in-focus state has been obtained by said focus adjusting device when the image pickup period is not longer than the first predetermined period, within a second predetermined period, to store an image for which the in-focus state has been obtained by said focus adjusting device in said memory device as a still image, and (iii) that is operable when the in-focus state has not been obtained by said focus adjusting device within the second predetermined period, to store an image obtained by said focus adjusting device when the second predetermined period has elapsed, in said memory device as a still image.

9. A moving image pickup apparatus that is capable of changing an image pickup period thereof as well as recording a still image, comprising:
    a focus adjusting device that carries out automatic focus adjustment during image pick up and that carries out automatic focus adjustment when still image recording is performed;
    a memory device;
    a setting device that sets as a processing mode to be executed, a selected one of (i) a first processing mode in which an image for which an in-focus state has been obtained by said focus adjusting device, carrying out automatic focus when still image recording is performed, is stored in said memory device as a still image, when the still image recording is designated and the in-focus state has been obtained by said focus adjusting device within a first predetermined time period, or an image obtained by said focus adjusting device, carrying out automatic focus when still image recording is performed, when the first predetermined time period has elapsed is stored in said memory device as a still image, when the still image recording is designated and the in-focus state has not been obtained by said focus adjusting device within the first predetermined time period, and (ii) a second processing mode in which an image subjected to the automatic focus adjustment by said focus adjusting device, carrying out automatic focus adjustment during image pick up, is stored in said memory device as a still image when the still image recording is designated; and a control device that causes the second processing mode to be executed irrespective of settings made by said setting device, when the image pickup period is longer than a second predetermined period.

10. A moving image pickup apparatus as claimed in claim 8 or claim 9, wherein the image pickup period is set to a value related to a shutter speed.

11. A moving image pickup apparatus as claimed in claim 10, wherein the first predetermined time period is set longer as the shutter speed is reduced.

12. A still image recording method applied to a moving image pickup apparatus that is capable of changing an image pickup period thereof as well as recording a still image, comprising:

a first focus adjusting step of carrying out automatic focus adjustment during image pickup;

a first storage step of storing an image subjected to the automatic focus adjustment in said first focus adjusting step, in a memory device as a still image, in response to designation of still image recording, when the image pickup period is longer than a first time period;

a second focus adjusting step of carrying out automatic focus adjustment in response to the designation of the still image recording, when the image pickup period is not longer than first time period;

a second storage step of storing an image for which an in-focus state has been obtained in said second focus adjusting step, in the memory device as a still image, when the in-focus state has been obtained in said second focus adjusting step within a second time period; and a third storage step of storing an image obtained in said second focus adjusting step when the predetermined time period has elapsed, in the memory device as a still image, when the in-focus state has not been obtained in said second focus adjusting step within the second time period.

13. A still image recording method applied to a moving image pickup apparatus that includes a first focus adjusting device that carries out automatic focus adjustment during image pickup, and a second focus adjusting device that carries out automatic focus adjustment when still image recording is performed, the moving image pickup apparatus being capable of changing an image pickup period thereof as well as recording a still image, the method comprising:

a setting step of setting as a processing mode to be executed, a selected one of a first processing mode in which an image for which an in-focus state has been obtained by the second focus adjusting device is stored in a memory device as a still image, when the still image recording is designated and the in-focus state has been obtained by the second focus adjusting device within a first time period, or an image obtained by the second focus adjusting device when the first time period has elapsed is stored in the memory device as a still image, when the still image recording is designated and the in-focus state has not been obtained by the second focus adjusting device within the first time period, and a second processing mode in which an image subjected to the automatic focus adjustment by the first focus adjusting device is stored in the memory device as a still image when the still image recording is designated; and a control step of causing the second processing mode to be executed irrespective of settings made in said setting step, when the image pickup period is longer than a second time period.

* * * * *

UNITED STATES PATENT AND TRADEMARK OFFICE
CERTIFICATE OF CORRECTION

PATENT NO. : 7,355,634 B2
APPLICATION NO. : 10/872512
DATED : April 8, 2008
INVENTOR(S) : Hitoshi Yasuda It is certified that error appears in the above-identified patent and that said Letters Patent is hereby corrected as shown below:

COLUMN 1
Line 25, "image e.g." should read --image, e.g.,--.

COLUMN 2
Line 64, "in-a" should read --in a--.

COLUMN 7
Line 3, "(i.e." should read --(i.e.,--.

COLUMN 8
Line 63, "is" should read --are--.

COLUMN 9
Line 2, "evaluation-value" should read --evaluation value--.

COLUMN 10
Line 21, "association" should read --association with--.

COLUMN 15
Line 3, "hand," should read --hand, if--.

COLUMN 16
Line 2, "use" should read --user--.

UNITED STATES PATENT AND TRADEMARK OFFICE
CERTIFICATE OF CORRECTION

PATENT NO.         : 7,355,634 B2
APPLICATION NO. : 10/872512
DATED              : April 8, 2008
INVENTOR(S)        : Hitoshi Yasuda It is certified that error appears in the above-identified patent and that said Letters Patent is hereby corrected as shown below:

<u>COLUMN 18</u>
Line 48, "pick up" should read --pickup--.

<u>COLUMN 19</u>
Line 5, "pick up," should read --pickup,--.

Signed and Sealed this

Sixteenth Day of December, 2008

JON W. DUDAS
*Director of the United States Patent and Trademark Office*